(No Model.) 2 Sheets—Sheet 2.
J. F. BARNES.
GATE.
No. 605,771. Patented June 14, 1898.
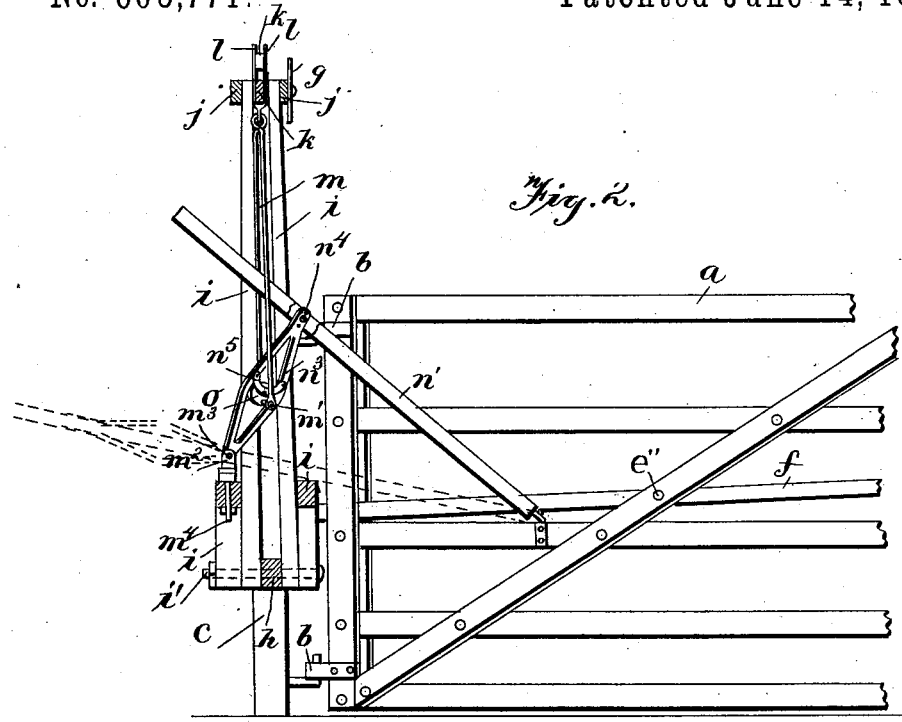
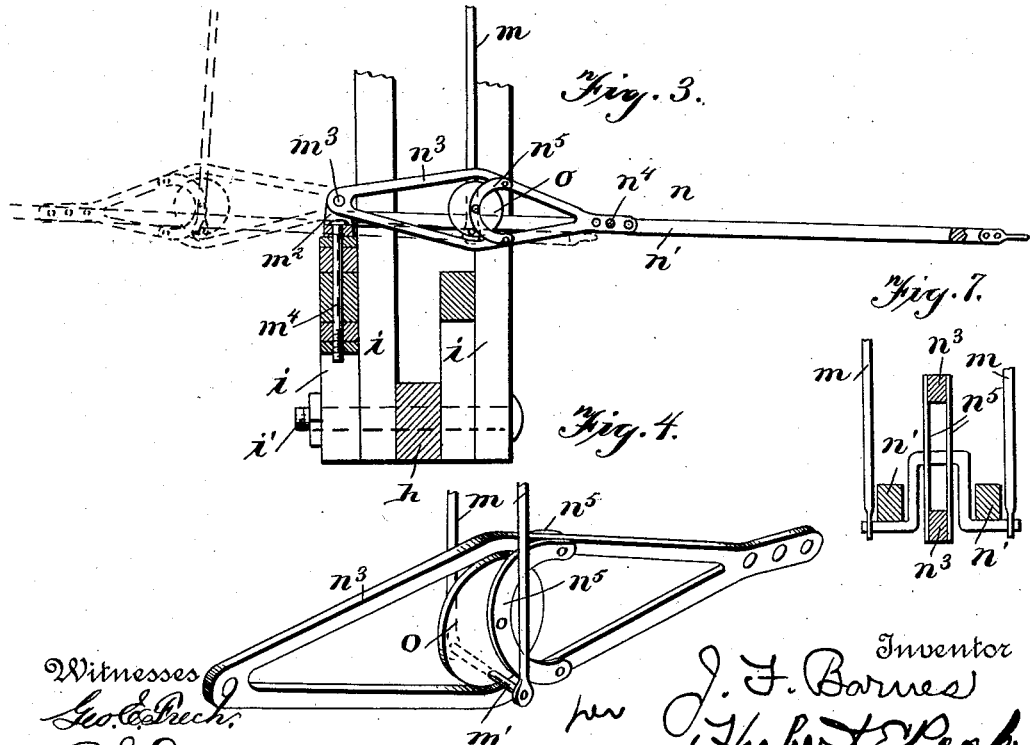
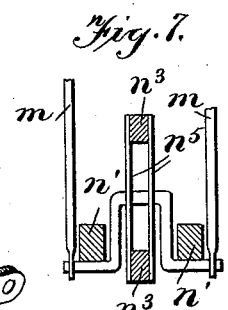
Witnesses
Geo. E. Prech.
A. S. Pattison
Inventor
J. F. Barnes
per Hubert E. Beck
Attorney

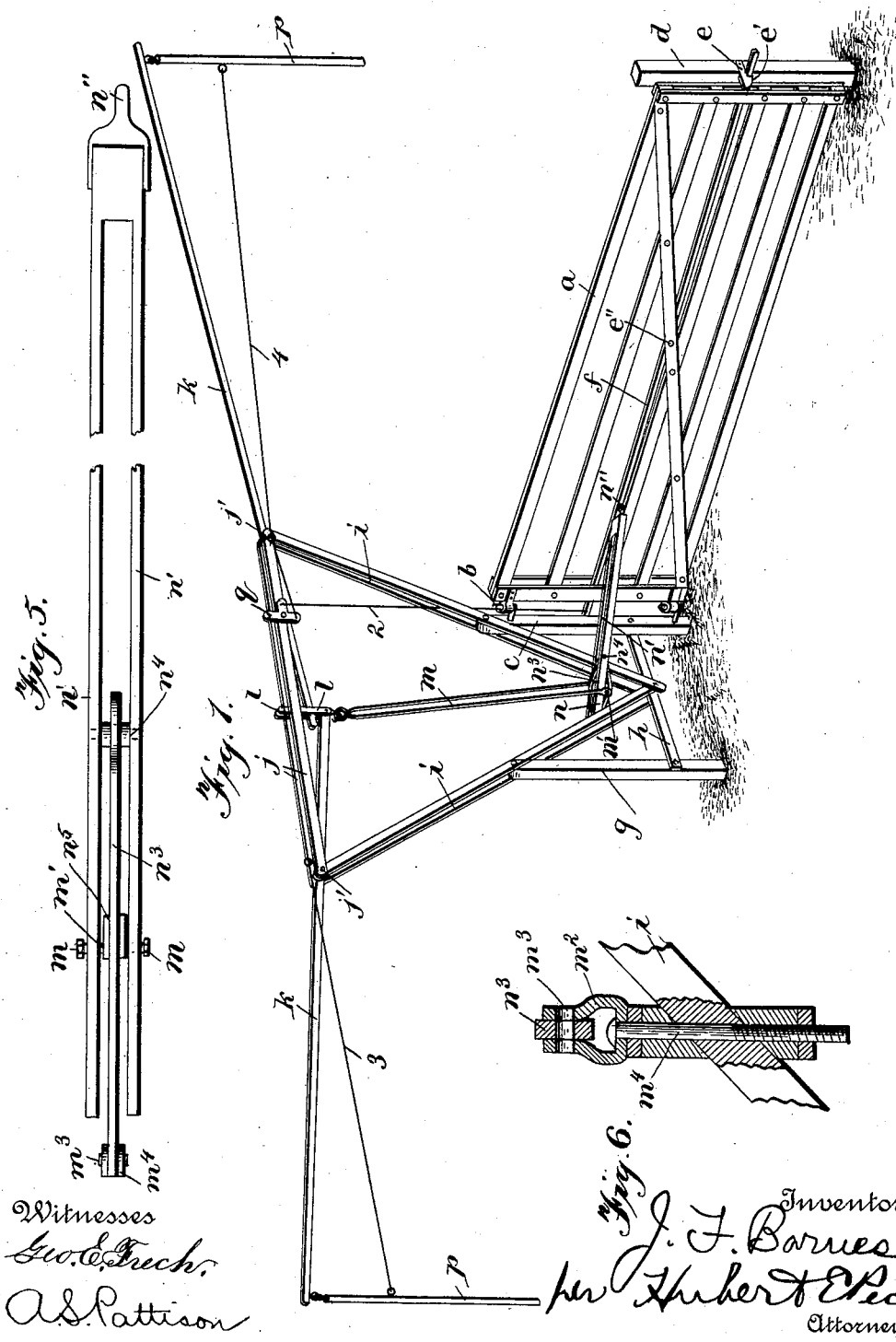

UNITED STATES PATENT OFFICE.

JOSHUA FRANK BARNES, OF SHANNON, ILLINOIS, ASSIGNOR OF ONE-HALF TO HENRY B. GSELL, OF SAME PLACE.

GATE.

SPECIFICATION forming part of Letters Patent No. 605,771, dated June 14, 1898.

Application filed August 11, 1897. Serial No. 647,870. (No model.)

*To all whom it may concern:*

Be it known that I, JOSHUA FRANK BARNES, a citizen of the United States, residing at Shannon, in the county of Carroll and State of Illinois, have invented certain new and useful Improvements in Gates; and I do hereby declare the following to be a full, clear, and exact description of the invention, such as will enable others skilled in the art to which it appertains to make and use the same.

This invention relates to certain improvements in gates, and more particularly to improvements in swinging lever-operated farm-gates.

The invention consists in certain novel features of construction and in details and in arrangements and in combinations of parts, as more fully and particularly described and pointed out hereinafter.

Referring to the accompanying drawings, Figure 1 is a perspective view of the gate and the operating means therefor, the gate being shown in its closed position. Fig. 2 is a vertical sectional view taken vertically through the sweep-supporting frame, showing a portion of the gate in elevation, the gate being shown swung partially open with the operating-toggle in the position it then assumes. Fig. 3 is a detail side elevation of the operating-toggle with one side of the long link removed, also showing a portion of the supporting-frame in section, full lines showing the toggle in the position it assumes when the gate is closed and dotted lines showing partially the position it assumes when the gate is open. Fig. 4 is a detail detached perspective view of the power-applying member or lever of the toggle, the lower portion of the operating connection from the sweep being shown in the position it assumes when the gate is closed or completely open, although the power-applying link member or lever of the toggle is shown in the position it assumes when the gate is closed. Fig. 5 is a detail top plan view of the operating-toggle shown in the position it assumes when the gate is closed. Fig. 6 is a vertical sectional view showing the manner of pivotally mounting the outer end of the gate-operating toggle to permit lateral swing of the toggle as the gate opens or closes. Fig. 7 is a detail sectional view illustrating a modification.

In the drawings, $a$ is a swinging gate of any suitable or desirable construction, at one end mounted by suitable hinges $b$ $b$ to the strong rigid vertical gate-post $c$ and at its free end closing against the gate-post $d$ at the opposite side of the roadway.

The gate-post $d$ is provided with a rigid catch $e$, extending in the direction in which the gate opens, with its beveled end and catching-shoulder $e'$ at the under side. The gate is provided with a suitable latch to engage said catch, and thereby hold the gate closed. This latch preferably consists of a long vertically-swinging bar $f$, arranged horizontally and longitudinally of the gate, with one end projecting from the free end of the gate and arranged to engage said catch and pass along the under side thereof and catch behind said shoulder to hold the gate locked. The said latch is pivoted at $e''$ between its ends and is so arranged that said free end constantly tends to swing to its limit of upward movement, and hence to remain normally held by said catch. The opposite end of the latch preferably, although not necessarily, extends beyond the inner hinged end of the gate to receive the latch-lifting means hereinafter described.

An improved construction of supporting-frame is provided for the gate-operating means, the preferred construction of which is as follows:

$g$ is a strong vertical post arranged a short distance from the gate-post $c$ and so that a vertical plane connecting said two posts will be approximately parallel with the roadway. $h$ is a horizontal sill rigidly secured to and connecting said posts and arranged near the lower portions thereof.

An upwardly-extending triangular-shaped structure is formed of three pairs of beams. The two pairs of beams $i$ $i$ have their lower ends meeting at about the center of the length of the sill $h$ and there rigidly secured by a single bolt $i'$, said beams from thence extending upwardly and outwardly in opposite directions. One pair of beams is secured by a bolt on opposite sides of the post $g$, and the opposite pair of beams $i$ is correspondingly secured to the upper end of the gate-post $c$. The extreme upper widely-separated ends of these two pairs of beams $i$ $i$ are then united by the horizontal pair of beams $j$, the separate beams of which are slightly separated and at their ends respectively united by single bolts $j'$ $j'$ to the upper ends of beams $i$ $i$, as clearly shown in Fig. 1.

Two horizontally-arranged vertically-swinging sweeps $k$ $k$ are provided extending along the roadway on opposite sides of the gate and arranged a suitable distance above the surface of the ground. The sweeps are respectively pivoted or fulcrumed on the bolts $j'$, uniting the upper ends of the beams $i$ and $j$, and are arranged between the beams $i$ $i$ and also between the two beams $j$ $j$, and the inner ends of the two sweeps meet at a point about beneath the center of the length of the beams $j$ $j$. Both sweeps have their inner ends pivotally joined to the vertical plates $l$ $l$ and are arranged one above the other between said plates, which are extended upwardly from said sweeps, with their upper ends between the two beams $j$ $j$ to hold the inner ends of the sweeps in the proper position and to guide them in their vertical movements to always move up between said beams $j$ $j$. It should be observed that the inner ends of the sweeps are arranged about directly above the point where the lower ends of the beams $i$ are secured to the bottom sill $h$ or above the apex of the triangle formed by the supporting-frame. $m$ is a connection at its upper end loosely secured or confined to the inner end of one of said sweeps and from thence hanging to and loosely connected with the gate-operating toggle $n$. This connection is formed of two parallel lengths extending down on opposite sides of the said toggle and at the lower end rigidly connected or secured together by the cross head or shaft $m'$. The gate-operating toggle is composed of the long link or lever $n'$, at its outer end loosely coupled at $n''$ to the gate at a distance from its hinged end and at a point intermediate between the top and bottom of the gate. This long link of the toggle is in length almost equal to the full length of the toggle, and it is formed of two parallel bars, with a space between them, said bars being rigidly secured together at or near their outer ends.

$n^3$ is the power lever or link of the toggle, which is relatively short in comparison with the link or lever $n'$, and is preferably, although not necessarily, composed of an open metal frame tapering toward the ends and arranged between and approximately parallel with the bars or sections of the long lever of the toggle when the gate is closed or entirely opened. Said power-lever of the toggle is pivoted at its inner end to the long lever of the toggle a distance from its inner end by a pin or bolt $n^4$, passed through the two bars of the long lever and through a hole in the outer end of the power-lever. The said end of the power-lever usually has a longitudinal series of bolt-holes, so that said bolt can be shifted from one to the other to vary the length of the toggle, according to varying conditions. The opposite end of the power-lever of the toggle is mounted between the ears of a rockable or turnable head $m^2$ on a horizontal pivot pin or bolt $m^3$. The said head turns horizontally on a vertical axis and is secured by and turns on a vertical bolt $m^4$, passing down through and rigidly secured to one of the beams $i$ of the supporting-frame and preferably through suitable blocks arranged on opposite sides thereof, whereby the turn-head is arranged in a horizontal plane preferably a short distance above the horizontal plane, including the pivotal coupling between the outer end of the toggle and the gate, and so that the toggle extends at a slight angle from the horizontal from the lower portion of the supporting-frame to the gate at an angle to the length of the gate. Parallel webs or plates or separated supports $n^5$ extend across the open central portion of said power-lever and are rigidly secured to the opposite sides thereof, and a wheel $o$ is arranged in the open center of said power-lever, mounted to freely turn on a pin secured to said supports. The cross head or shaft $m'$ of the connection $m$, depending from the sweeps, passes loosely through and is journaled in said wheel eccentrically thereto and at a point near its periphery. The long lever of the toggle is preferably of a length to embrace the power-lever and extend almost to said turn-head when the gate is closed, and hence rest on the cross-shaft $m'$ with the points of coupling the toggle to the gate and to the cross-head and the axis of the wheel in a straight line, while the point of connection between said cross-shaft and said wheel is a distance below said straight line, whereby the gate is held firmly locked against opening irrespective of the latch, which is not absolutely necessary, although usually employed to prevent small strong animals springing the gate open a short distance without moving up the toggle at its joint.

When either sweep is drawn down, the connection $m$ lifts the toggle through the medium of the cross-shaft, wheel, and power-lever, and thereby swings open the gate, (the latch having been previously opened, as hereinafter described.) As the power-lever swings up and lifts the long lever (see Fig. 2) the wheel turns and constantly shifts the point of application of power to the power-lever with respect to the fulcrum thereof at the turn-head, and thereby shortens the throw of the sweep necessary to completely open the gate, which is a point of great advantage, as well understood by those skilled in the art. As the outer end pivot of the toggle to the turn-head is a distance to one side of the vertical line between the point of coupling the connection $m$ to the sweeps and the joint between said connection and the toggle and by reason of the eccentric shifting connection between said connection m and the toggle, the said operating parts cannot stick or lock on a dead-center during the opening or closing of the gate, but will fall either one way or the other, according to the force applied to the sweep. As the gate reaches its limit of opening swing the power-lever again enters between the bars of the long lever and is located between the gate and joint between the power and long lever, with said long lever resting on the turn-head and on the cross-shaft, the said wheel having made about one-half a complete revolution. In this position when the gate is completely opened the toggle firmly locks the gate against accidental or too sudden closing, as the parts assume the same locking positions before described when the gate is closed. The gate is closed by simply pulling down on either sweep, which raises the long lever through the medium of the power-lever and other connections, closing the gate, with the levers of the toggle in direct continuation of each other, as shown in Fig. 1.

It should be observed that when the members of the toggle are in continuation of each other, which position is assumed when the gate is closed or completely opened, the connection m has the greatest leverage on the power-lever, as the cross-shaft thereof is then at its greatest distance from the turn-head, and that as the gate swings the turn-head permits the desired lateral swing of the toggle with the gate.

It should also be noted that a crank-shaft, as shown in Fig. 7, might be employed in place of the cross-shaft and wheel; but I prefer to employ the wheel as the most desirable from a practical commercial standpoint.

The free end of each sweep is provided with a depending handle p at its upper end, loosely coupled to the sweep. A three-armed lever q is pivoted on the horizontal upper portion of the triangular frame above the inner free end of the vertically-swinging latch. This three-armed lever is pivoted to swing vertically and has a horizontal arm connected by wire or other connection 2 with the said inner end of said latch and has the two vertical arms connected by wires 3 4 or other connections with said two handles, respectively. Thus in operating the gate either one of said handles is grasped and pulled slightly outwardly, which through said wires and three-armed lever raises the inner end of the latch and depresses the opposite end thereof sufficiently to clear the catch, and then a slight downward pull (usually about eighteen inches in a full-sized gate) draws down the sweep to operate the toggle in opening the gate.

The gate opening and closing device is exceedingly simple and durable in construction and is composed of a minimum number of inexpensive parts which can be easily put together at a minimum cost. The peculiar supporting-frame is very rigid and strong and can be easily and cheaply built, requiring but the five bolts to hold the triangular frame and in addition the extra post and bottom sill and the securing means for the sill.

The gate can be easily opened and closed even though considerably tilted from the horizontal position and requires but little power and movement by reason of the peculiar construction and arrangement of operating-toggle.

Having thus fully described my invention, what I claim as new, and desire to secure by Letters Patent of the United States, is—

1. In combination, a swinging gate, a support, a gate opening and closing toggle loosely joined to the support and gate, said toggle comprising a member joined at one end to the support and at the opposite end to an intermediate portion of the longer member which is joined to the gate, said longer member beside and parallel with the short member and resting on and upheld by said support when the gate is both completely opened and closed, one member having a cross-head on which the other member closes when the gate is opened and closed, and toggle-actuating means connected with said cross-head, substantially as described.

2. In combination, a swinging gate, a support, a turn-head on the support, a gate opening and closing toggle comprising a member joined to the gate and having a longitudinal opening, a power member in the opening of said member and at one end pivoted to said turn-head and at the other end pivoted to said first-mentioned member a distance inwardly from the free end thereof so that said power member lies within and parallel with said first-mentioned member which rests on said turn-head when the gate is completely opened and closed, and toggle-actuating means, substantially as described.

3. In combination, a swinging gate, a support, a gate opening and closing toggle comprising a long member loosely joined to the gate and a short member loosely joined to the support and at one end joined to an intermediate point of the long member so that said members are side by side and parallel when the gate is completely opened and closed, a cross-head confined to the short member and beneath and down on which the long member closes, and toggle-actuating means connected to said cross-head.

4. A gate and its posts, in combination with an upright triangular supporting-frame, arranged beside the gate, means for opening and closing the gate coupled to the lower portion of said frame, sweeps pivoted at the upper horizontal portion of said frame with their inner ends arranged about at the central portion of said upper horizontal part of the frame and loosely connected to said gate-operating means, substantially as described.

5. A gate, in combination with two parallel upright posts, a sill connecting the lower portions thereof, an upright triangular supporting-frame having two inclined sides meeting and secured together at or about the center of said sill, said sides also secured respectively to the upper portions of the posts and having their upper ends connected by the horizontal sides, gate opening and closing means connected to said frame, and sweeps controlling said means and mounted at the upper corners of said frame, substantially as described.

6. In combination, a swinging gate, a supporting-frame adjacent thereto, a gate opening and closing toggle, a connection provided with toggle-operating means, said connection having a loose eccentric connection with one member of the toggle for the purpose substantially as described.

7. A swinging gate having a gate opening and closing toggle, a toggle-actuating connection having operating means, and a shifting eccentric connection between said toggle and said actuating connection, combined substantially as described.

8. In combination, a swinging gate, a support, a gate opening and closing toggle comprising a long lever with a longitudinal opening coupled to the gate, a short power-lever coupled to the support and arranged within said opening of the long lever and pivoted thereto and arranged in and parallel with said long lever when the gate is closed and when at its limit of opening swing, and operating means loosely joined to said power-lever, substantially as described.

9. In combination, a swinging gate, a support, a gate opening and closing toggle having one member loosely joined to the gate and the other member loosely joined to the support, one member having a wheel mounted to turn therein, an operating connection eccentrically and loosely connected to said wheel, and actuating means for said connection, substantially as described.

10. In combination, a swinging gate, a support, a gate opening and closing toggle comprising the long lever coupled to the gate and formed with the longitudinal opening, the short power-lever within said opening and at one end pivoted to said long lever at a distance from its outer end and at its opposite end pivoted to the support, and an operating connection having a cross-head beneath and against which the long lever locks, which cross-head is loosely and eccentrically joined to the power-lever, substantially as described.

11. In combination, a gate, a support, a gate opening and closing toggle comprising a member coupled to the gate and a power-lever coupled to the support and having an open central portion, a rotary wheel mounted in said open central portion, a cross-shaft eccentrically mounted in said wheel and against which said member is arranged to lock or rest when the gate is completely opened or closed, and an operating connection confined to said cross-shaft, substantially as described.

12. In combination, a swinging gate, a support, a gate-operating toggle confined to the gate and the support and comprising members of unequal lengths, one member joined to the other at an intermediate point thereof, and toggle-actuating means provided with a cross-head confined at an intermediate point in one member so that the other member closes down thereon when the gate is open and closed, substantially as described.

In testimony whereof I affix my signature in presence of two witnesses.

JOSHUA FRANK BARNES.

Witnesses:
HUBERT E. PECK,
A. S. PATTISON.